(12) United States Patent
Kondo

(10) Patent No.: US 6,278,806 B1
(45) Date of Patent: *Aug. 21, 2001

(54) STORAGE APPARATUS AND STORAGE METHOD

(75) Inventor: Tetsujiro Kondo, Kanagawa (JP)

(73) Assignee: Sony Corporation, Tokyo (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/121,417

(22) Filed: Jul. 23, 1998

(30) Foreign Application Priority Data

Jul. 30, 1997 (JP) ................................... 9-204372

(51) Int. Cl.$^7$ ....................................................... G06K 9/54
(52) U.S. Cl. ......................... 382/305; 345/515; 345/521; 711/200
(58) Field of Search .................. 382/305, 276, 382/298, 299, 302, 300, 307, 238, 254; 711/200, 100, 170, 173; 345/193, 196, 132, 515, 519, 521, 516, 508

(56) References Cited

U.S. PATENT DOCUMENTS

| | | | |
|---|---|---|---|
| 4,751,585 | 6/1988 | Shibazaki | 358/294 |
| 4,965,770 * | 10/1990 | Yanagisawa | 365/238.5 |
| 5,070,465 * | 12/1991 | Kato et al. | 395/141 |
| 5,325,189 * | 6/1994 | Mimura | 348/231 |
| 5,473,342 | 12/1995 | Tse et al. | 345/132 |
| 5,585,864 | 12/1996 | Takeuchi | 348/719 |
| 5,701,160 * | 12/1997 | Kimura et al. | 348/413 |
| 5,850,487 * | 12/1998 | Takane et al. | 382/298 |
| 5,859,667 | 1/1999 | Kondo et al. | 348/414 |
| 5,864,347 * | 1/1999 | Inoue | 345/516 |
| 5,930,394 | 7/1999 | Kondo et al. | 382/232 |
| 5,940,146 * | 8/1999 | Sakaguchi et al. | 348/718 |
| 5,950,223 * | 9/1999 | Chiang et al. | 711/105 |
| 5,959,676 | 9/1999 | Kondo et al. | 348/421 |

FOREIGN PATENT DOCUMENTS

| | | |
|---|---|---|
| 0 389 811 | 10/1990 | (EP) . |
| 0 577 337 | 1/1994 | (EP) . |
| 653 742 A2 | 5/1995 | (EP) . |
| WO 94 14138 | 6/1994 | (WO) . |

OTHER PUBLICATIONS

Patent Abstracts of Japan, vol. 1995, No. 04, May 31, 1995, JP 07 030859.
Patent Abstracts of Japan, vol. 1997, No. 03, Mar. 31, 1997, JP 08 317347.
Patent Abstracts of Japan, vol. 1997, No. 03, Mar. 31, 1997, JP 08 307835.
Patent Abstracts of Japan, vol. 1995, No. 06, Jul. 31, 1995, JP 07 086955.
L. Wang, *Reduced–difference pyramid: a data structure for progressive image transmission*, Optical Engineering, Jul. 1999, vol. 28, No. 7, pp 708–716.

\* cited by examiner

*Primary Examiner*—Leo Boudreau
*Assistant Examiner*—Kanji Patel
(74) *Attorney, Agent, or Firm*—Frommer Lawrence & Haug, LLP; William S. Frommer; Glenn F. Savit

(57) ABSTRACT

A storage apparatus and a storage method for storing data of an input image so that an image formed by enlarging the input image can be immediately obtained. In an input image memory 2, an input image is sequentially stored with addresses designated by horizontal and vertical addresses corresponding to positions of pixels in the vertical and horizontal directions, respectively. After pixels of the input image necessary for forming a pixel-multiplied image which is an image formed of a number of pixels greater than the number of pixels forming the input image have been stored in the input image memory, these pixels are read to a pixel-multiplied image forming circuit and are used to form pixels of the pixel-multiplied image. This pixel-multiplied image is stored in a pixel-multiplied image memory with addresses designated by the horizontal and vertical addresses.

20 Claims, 11 Drawing Sheets

FIG. 8

○ --- PIXEL OF INPUT IMAGE
× --- PIXEL OF PIXEL-MULTIPLIED IMAGE

STORAGE APPARATUS AND STORAGE METHOD

BACKGROUND OF THE INVENTION

1. Field of the Invention

The present invention relates to a storage apparatus and a storage method and, more particularly, to a storage apparatus and a storage method suitable for, for example, use for enlarging an image.

2. Description of the Related Art

A coding method is known in which high-resolution image data is set as most basic layer or first layer image data, second layer image data of a smaller number of pixels is formed, and third level image data of a further smaller number of pixels is formed, followed by formation of fourth to uppermost layer image data. Such coding is called hierarchical coding, and image data in each layer is displayed on a monitor having a resolution (number of pixels) corresponding to the layer. Accordingly, a user can select image data in hierarchically encoded image data corresponding to the resolution of a user's monitor to view corresponding images.

In the conventional hierarchical coding, however, original image data is set as first layer image data and only image data in high layers relating to smaller numbers of pixels is formed. That is, by the conventional hierarchical coding, no image is formed of a number of pixels larger than the number of pixels of original image data.

In hierarchical coding, it is convenient to use a method of forming an image of a number of pixels larger than the number of pixels of original image data (hereinafter referred to as pixel-multiplied image as occasion demands) when, for example, electronic zooming is performed.

That is, if an image of a number of pixels smaller than the number of pixels of original image data is prepared, the image can be immediately reduced in size, and, if a pixel-multiplied image is prepared, the image can be immediately increased in size.

In general, in electronic zooming, the image enlarging function is used more frequently than the image reducing function. That is, in a case where a user is viewing, for example, an image transmitted or reproduced from a recording medium, it is quite possible that he or she wants to enlarge a part or the entirety of the viewed image.

SUMMARY OF THE INVENTION

In view of these circumstances, an object of the present invention is, for example, to provide a storage apparatus and a storage method for storing data of an image so that the image can be immediately enlarged.

To achieve this object, according to one aspect of the present invention, there is provided a storage apparatus for storing an image comprising a first memory section having addresses designated therein by at least first and second address signals to store an input image, a forming section for forming, from the input image, a pixel-multiplied image which is an image formed of a number of pixels greater than the number of pixels forming the input image, and a second memory section having addresses designated therein by at least the first and second address signals to store the pixel-multiplied image.

According to another aspect of the present invention, there is provided a storage method comprising the steps of making a first memory section store an input image, the first memory section having addresses designated therein by at least first and second address signals, forming, from the input image, a pixel-multiplied image which is an image formed of a number of pixels greater than the number of pixels forming the input image, and making a second memory section store the pixel-multiplied image, the second memory section having addresses designated therein by at least the first and second address signals.

BRIEF DESCRIPTION OF THE DRAWINGS

FIG. 8 is a diagram for explaining processing in the classification block forming circuit 41 and the predicted value calculation block forming circuit 42 shown in FIG. 7;

DESCRIPTION OF THE PREFERRED EMBODIMENTS

Figure 1:
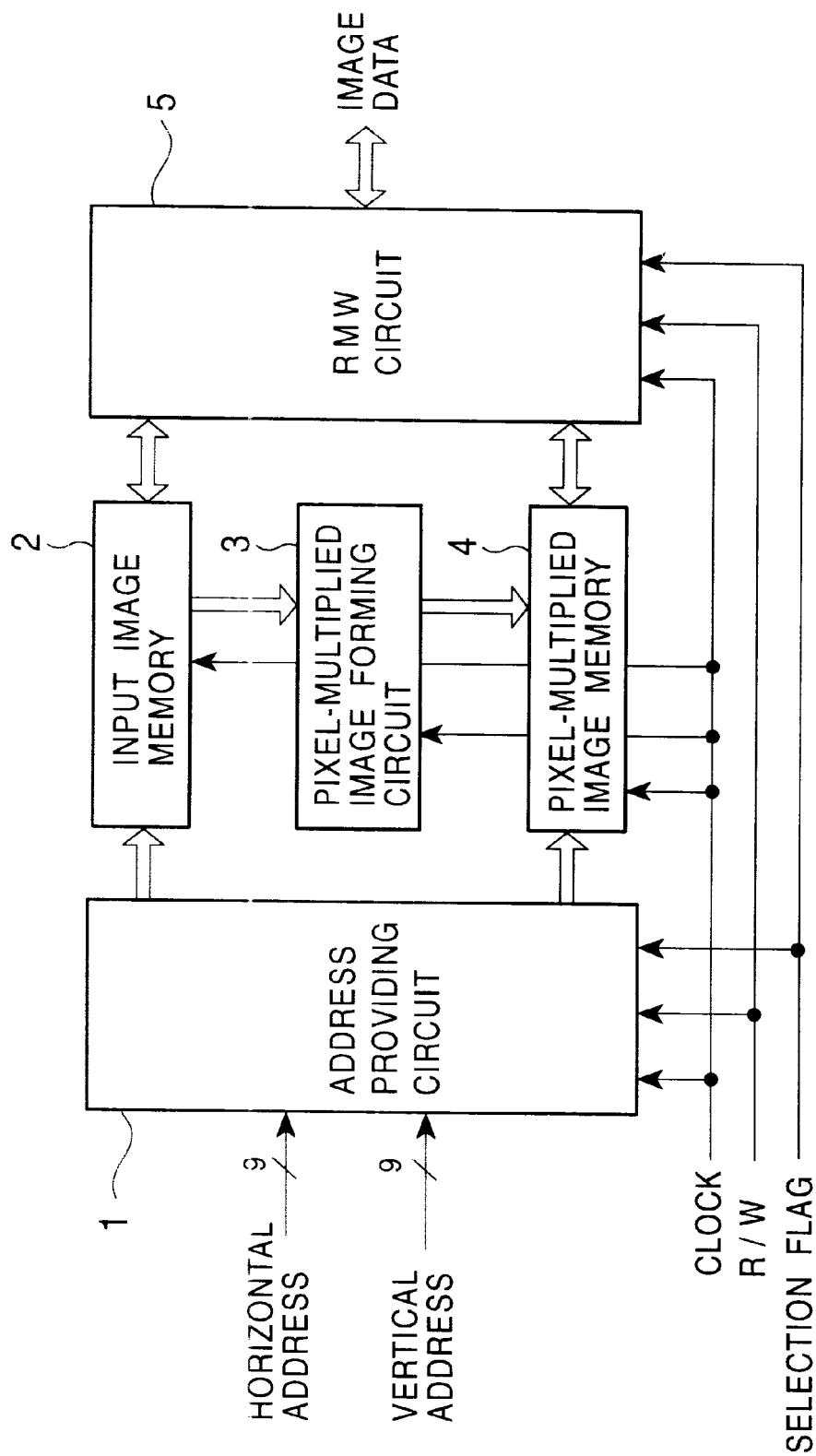
FIG. 1 is a block diagram showing the configuration of an embodiment of a storage apparatus to which the present invention has been applied.

FIG. 1 shows the configuration of an embodiment of a storage apparatus to which the present invention has been applied.

This storage apparatus is formed of, for example, a complementary metal oxide semiconductor (CMOS) in one chip or the like, and is arranged to store an image input thereto and to perform hierarchical coding for forming and storing a pixel-multiplied image, i.e., an image having a number of pixels greater than the number of pixels of the input image.

An address supply circuit 1 is supplied with horizontal and vertical addresses, each of which is an address corresponding to the position in the horizontal or vertical direction of a pixel constituting an image (input image) input to the storage apparatus.

This embodiment will be described with respect to a case where an image having one frame formed of 512 pixels in the horizontal direction and 512 lines in the vertical direction. Accordingly, each of the group of horizontal addresses and the group of vertical addresses is represented by 9 (=$\log_2 512$) bits.

The address supply circuit 1 is arranged to process horizontal and vertical addresses supplied to it according to one's need and to supply addresses to an input image memory 2 and to a pixel-multiplied image memory 4. The address supply circuit 1 is also supplied with a clock (not shown in FIGS. 5 to 7), a read and write (R/W) signal and a selection flag as well as horizontal and vertical addresses. The address supply circuit 1 is arranged to supply addresses to the input image memory 2 and to the pixel-multiplied image memory 4 in synchronization with the clock. The address supply circuit 1 is also arranged to process horizontal and vertical addresses supplied to it, according to the R/W signal and the selection flag.

The R/W signal is a signal for designating reading of image data from the storage apparatus or writing of image data to the storage apparatus, and the selection flag is, for example, a one-bit flag for designating reading of an image stored in the input image memory 2 or reading of an image stored in the pixel-multiplied image memory 4. The selection flag is effective (significant) only when the R/W signal designates reading of image data. That is, since writing of image data to the input image memory 2 and writing of image data to the pixel-multiplied image memory 4 are performed in parallel with each other (substantially simultaneously with each other) as described below, the selection flag is ignored at the time of writing.

Figure 2:
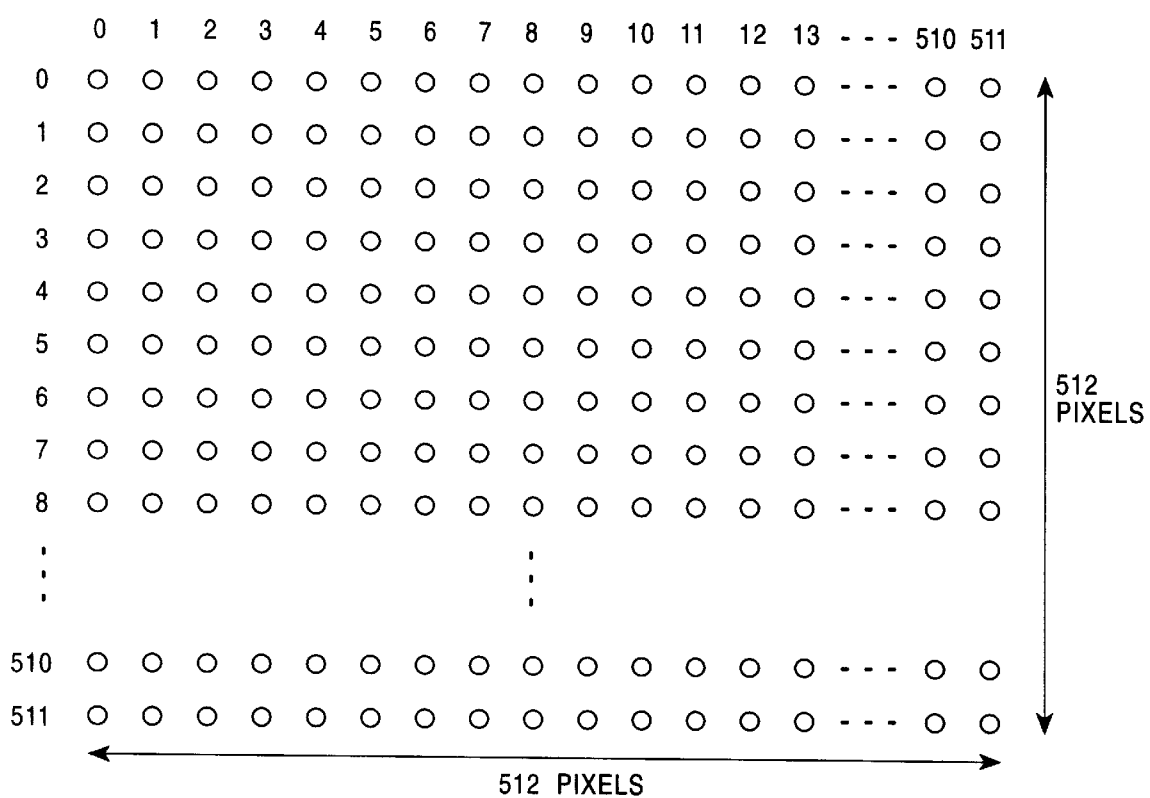
FIG. 2 is a diagram showing an input image input to the storage apparatus shown in FIG. 1.

The input image memory 2 (first storage means) is arranged to store, with addresses from the address supply circuit 1, image data supplied from a read modify write (RMW) circuit 5, and to read out and output to the RMW circuit 5 the image data stored with the addresses. The input image memory 2 stores an image input to the storage apparatus (referred to as original image as occasion demands) without changing the image. Also, the input image memory 2 can store at least one frame of an original image, i.e., image data of 512×512 pixels, as shown in FIG. 2. Further, memory cells forming the input image memory 2 have at least a data length corresponding to, for example, the number of bits assigned to each of pixels forming an original image. That is, if one pixel constituting an original image is represented by, for example, eight bits, the memory cells forming the input image memory 2 have at least a data length of eight bits.

A pixel-multiplied image forming circuit 3 (forming means) is arranged to form a pixel-multiplied image from the original image stored in the input image memory 2, and supplies the pixel-multiplied image to the pixel-multiplied image memory 4. That is, with respect to an observed pixel constituting an original image, e.g., a pixel A, shown in FIG. 3, the pixel-multiplied image forming circuit 3 newly forms a pixel $a_{12}$ between the observed pixel $A_1$ and a pixel $A_2$ located adjacently on the right-hand side of the observed pixel $A_1$ and a pixel $a_{13}$ between the observed pixel $A_1$ and a pixel $A_3$ located adjacently below the observed pixel $A_1$, and also forms a pixel $a_{1234}$ between the observed pixel $A_1$ and a pixel $A_4$ located adjacently off to the lower right of the observed pixel $A_1$ (between pixels $A_2$ and $A_3$). The pixel-multiplied image forming circuit 3 performs such processing with respect to each of observed pixels successively selected from all the pixels forming the original image, thereby forming an image having the number of pixels in each of the horizontal and vertical directions set twice as many as that of the original image, i.e., an image having 1024×1024 pixels as (the number of columns)×(the number of rows), as shown in FIG. 4.

As a method of forming a pixel-multiplied image in the pixel-multiplied image forming circuit 3, a method may be used in which one pixel constituting a pixel-multiplied image is formed by performing weighting addition using a plurality of pixels constituting an original image and having a correlation with the one pixel. That is, in such a case, referring to FIG. 3, pixel $a_{12}$ of a pixel-multiplied image may be, for example, the average of the pair of pixels $A_1$ and $A_2$ of the original image adjacent to pixel $a_{12}$ in the horizontal direction (obtained by weighting addition of $A_1$ and $A_2$ with the weight of each of $A_1$ and $A_2$ set to 1). Also, pixel $a_{13}$ of the pixel-multiplied image may be, for example, the average of the pair of pixels $A_1$ and $A_3$ of the original image adjacent to pixel $a_{13}$ in the vertical direction. Further, pixel $a_{1234}$ of the pixel-multiplied image may be, for example, the average of the pairs of pixels $A_1$, $A_2$, $A_3$, and $A_4$ of the original image adjacent to pixel $a_{1234}$ in diagonal directions. Also in such a case, pixel $A_1$ of the original image, for example, may be used, without being changed, as the pixel of the pixel-multiplied image at the corresponding position.

The pixel-multiplied image memory 4 (second storage means) is arranged to store image data supplied from the pixel-multiplied image forming circuit 3, i.e., a pixel-multiplied image in this embodiment, with addresses from the address supply circuit 1, and to read out and output to the RMW circuit 5 the image data stored with the addresses. The pixel-multiplied image memory 4 has a storage capacity for storage of at least one frame of a pixel-multiplied image, i.e., an image formed of 1024×1024 pixels, such as shown in FIG. 4, in this embodiment. Memory cells forming the pixel-multiplied image memory 4 have at least a data length sufficient to be able to store the pixels forming the pixel-multiplied image supplied from the pixel-multiplied image forming circuit 3 without omission of any digit. Also, the data length of the memory cells forming the pixel-multiplied image memory 4 may be set to, for example, eight bits, i.e., the same data length as that of the input image memory 2.

The clock is supplied to the input image memory 2, to the pixel-multiplied image forming circuit 3 and to the pixel-multiplied image memory 4. In synchronization with the clock, reading or writing of data is performed in the input image memory 2 and the pixel-multiplied image memory 4, and a pixel-multiplied image is formed in the pixel-multiplied image forming circuit 3.

The RMW circuit 5 is arranged to write, to the input image memory 2, image data supplied as original data to the storage apparatus. The RMW circuit 5 is also arranged to read out and output image data stored in the input image memory 2 or image data stored in the pixel-multiplied image memory 4. The clock, the R/W signal and the selection flag are supplied to the RMW circuit 5. The RMW circuit 5 is arranged to perform various kinds of processing in synchronization with the clock and based on the R/W signal and the selection flag.

Figure 5:
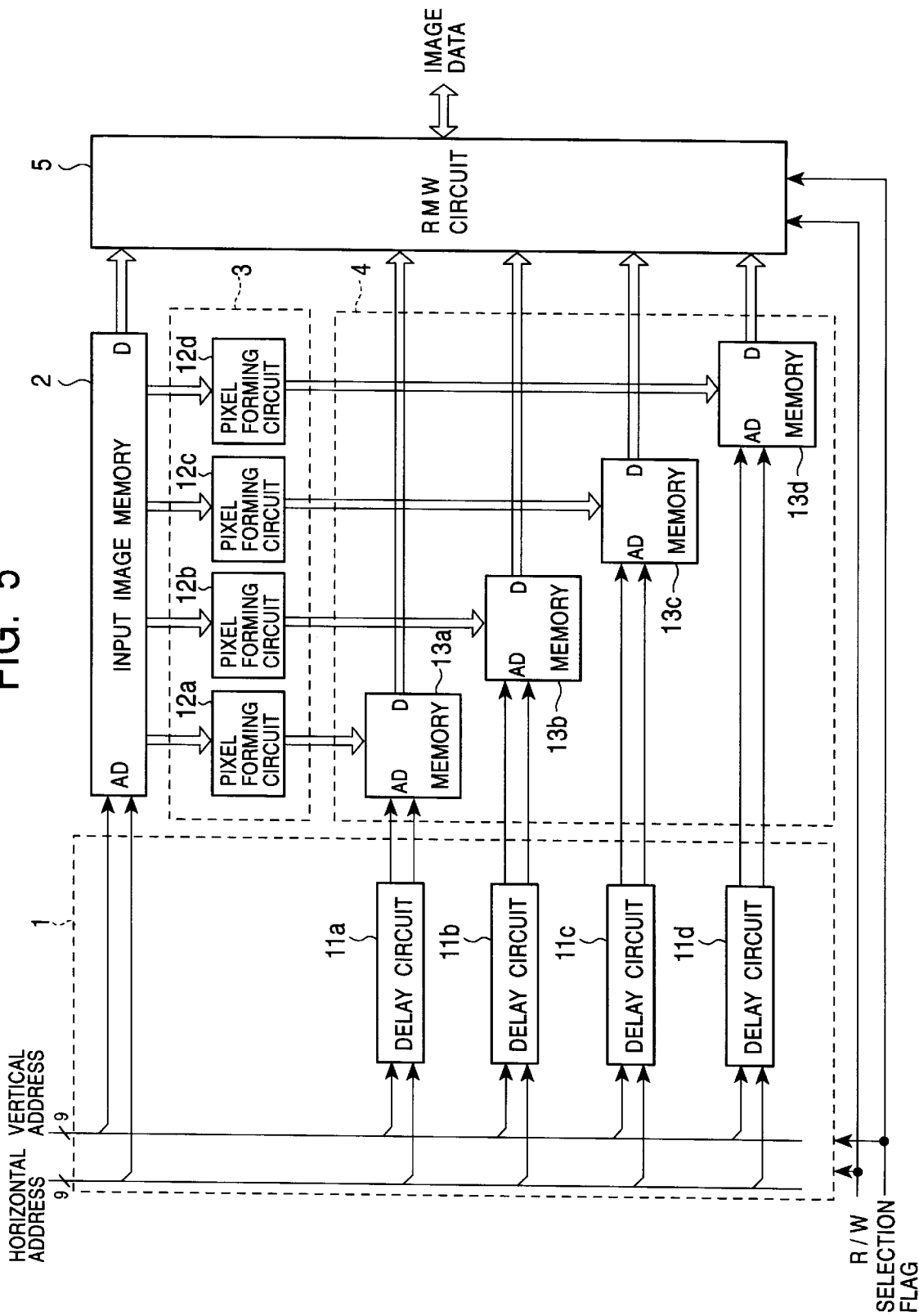
FIG. 5 is a block diagram showing a first detailed arrangement for the storage apparatus shown in FIG. 1.

FIG. 5 shows a first detailed arrangement for the storage apparatus shown in FIG. 1.

The storage apparatus will be described with respect to a case where image data in which each of 512×512 pixels is represented by eight bits is supplied as an original image to the storage apparatus as shown in FIG. 2, and where the image data is supplied by being scanned in a progressive scan manner.

Further, for ease of explanation, pixels forming an original image will be expressed in such a manner that the leftmost and uppermost pixel is p(0, 0), and the pixel at the (x+1)th position from the leftmost position and at the (y+1)th position from the uppermost position, representing the other pixels, is p(x, y). Since an original image is formed of 512×512 pixels as described above, each of x and y has an integer value in the range of 0 to 511 (=$2^9$−1).

In this embodiment, a pixel-multiplied image formed of 1024×1024 pixels as shown in FIG. 4 is formed from an original image in the pixel-multiplied image forming circuit 3. For ease of explanation, pixels forming such a pixel-multiplied image will be expressed in such a manner that the leftmost and uppermost pixel is q(0, 0), and the pixel at the (m+1)th position from the leftmost position and at the (n+1)th position from the uppermost position, representing the other pixels, is q(m, n). Since a pixel-multiplied image is formed of 1024×1024 pixels, each of m and n has an integer value in the range of 0 to 1023 (=$2^{10}$−1).

Further, it is assumed that, in each of a data writing period and a data reading period, combinations (HA, VA) of horizontal address HA and vertical address VA are supplied in synchronization with the clock in the following order:

(0, 0), (1, 0), . . . , (511, 0),
(0, 1), (1, 1), . . . , (511, 1),
.
.
.
(511, 0), (511, 1), . . . , (511, 511), i.e., the order corresponding to the progressive scan.

When image data is written to the storage apparatus, an original image is supplied to the RMW circuit 5 by being progressively scanned in synchronization with the clock. With this image data supply, horizontal address HA and vertical address VA are supplied to the address supply circuit 1, as described above.

In the embodiment shown in FIG. 5, the address circuit 1 is formed with delay circuits 11a, 11b, 11c, and 11d included therein. The delay circuits 11a, 11b, 11c, and 11d are arranged to delay, by necessary time periods, horizontal address HA and vertical address VA supplied to the address supply circuit 1, and to supply the delayed addresses to address terminals (AD) of memories 13a, 13b, 13c, and 13d constituting the pixel-multiplied image memory 4. The address supply circuit 1 is also arranged to directly supply, to address terminals (AD) of the input image memory 2, the horizontal address HA and vertical address VA supplied to the address supply circuit 1.

The pixel-multiplied image forming circuit 3 is formed of pixel forming circuits 12a, 12b, 12c, and 12d. Each of the pixel forming circuits 12a, 12b, 12c, and 12d is arranged to read out one or more pixels constituting an original image stored in the input image memory 2, to successively form one or more pixels constituting a pixel-multiplied image from the pixels read out, and to respectively supply the formed pixels to the memories 13a, 13b, 13c, and 13d constituting the pixel-multiplied image memory 4.

The pixel-multiplied image forming circuit 3 is formed of four pixel forming circuits 12a to 12d for the reason described below. That is, while one frame of an original image is formed of 512×512 pixels, one frame of a pixel-multiplied image is formed of 1024×1024 pixels. Accordingly, if this relationship is simply considered, one pixel of an original image corresponds to four pixels of a pixel-multiplied image. Then, to form four pixels of a pixel-multiplied image with respect to one pixel of an original image, the pixel-multiplied image forming circuit 3 is formed of four pixel forming circuits 12a to 12d for respectively forming four pixels.

It is assumed here that four pixels q(2x, 2y), q(2x+1, 2y), q(2x, 2y+1), and q(2x+1, 2y+1) of a pixel-multiplied image are related to one pixel p(x, y) of an original image (for example, in a case where, referring to FIG. 3, pixel $A_1$ of an original image is an observed pixel, a pixel of a pixel-multiplied image at the position of pixel $A_1$ and adjacent pixels $a_{12}$, $a_{13}$, and $a_{1234}$ of the pixel-multiplied image are formed), and that pixels q(2x, 2y), q(2x+1, 2y), q(2x, 2y+1), and q(2x+1, 2y+1) of the pixel-multiplied image are generated in the pixel forming circuits 12a to 12d, respectively.

The pixel-multiplied image memory 4 is formed of four memories 13a to 13d, as mentioned above. The memories 13a to 13d are arranged to respectively store pixels q(2x, 2y), q(2x+1, 2y), q(2x, 2y+1), and q(2x+1, 2y+1) of a pixel-multiplied image supplied from the pixel forming circuits 12a to 12d with addresses supplied from the delay circuits 11a to 11d. Accordingly, each of the memories 13a to 13d has a capacity for storing 512×512 pixels.

The memories 13a to 13d are also arranged to read out pixels q(2x, 2y), q(2x+1, 2y), q(2x, 2y+1), and q(2x+1, 2y+1) of a pixel-multiplied image stored therein, by addresses supplied from the delay circuits 11a to 11d, and to output the pixels to the RMW circuit 5.

The operation of this storage apparatus will next be described.

First, when image data is written, that is, the R/W signal designates writing, the address supply circuit 1 directly supplies the input image memory 2 with horizontal address HA and vertical address VA supplied to the address supply circuit 1. On the other hand, the RMW circuit 5 writes original image data supplied to it. The RMW circuit 5 writes the original image data in the memory cells (not shown) of the input image memory 2 designated by horizontal addresses HA and vertical addresses VA. The same processing is repeated to store in the input memory 2 one frame of an original image formed of 512×512 pixels. That is, in this manner, first-layer pixels (pixel values):

$p(0, 0), p(1, 0), ..., p(511, 0),$
$p(0, 1), p(1, 1), ..., p(511, 1),$
$...$
$p(511, 0), p(511, 1), ..., p(511, 511)$ are respectively stored in the input image memory 2 with addresses:

(0, 0), (1, 0), ..., (511, 0),
(0, 1), (1, 1), ..., (511, 1),
...
(511, 0), (511, 1), ..., (511, 511).

When the pixels of the original image necessary for generating pixels q(2x, 2y), q(2x+1, 2y). q(2x, 2y+1), and q(2x+1, 2y+1) forming a pixel-multiplied image are stored in the input image memory 2, the pixels (pixel values) of the original image are read to the pixel forming circuits 12a to 12d of the pixel-multiplied image forming circuit 3, and the pixel forming circuits 12a to 12d respectively generate pixels q(2x, 2y), q(2x+1, 2y), q(2x, 2y+1), and q(2x+1, 2y+1) of the pixel-multiplied image and respectively supply these pixels to the memories 13a to 13d.

That is, the pixel of the pixel-multiplied image at the position of pixel $A_1$ of the original image is, for example, pixel $A_1$, as mentioned above with reference to FIG. 3. Accordingly, when pixel $A_1$ is stored in the input image memory 2, the pixel forming circuit 12a directly reads out and supplies pixel $A_1$ to the memory 13a as pixel q(2x, 2y) of the pixel-multiplied image.

Figure 3:
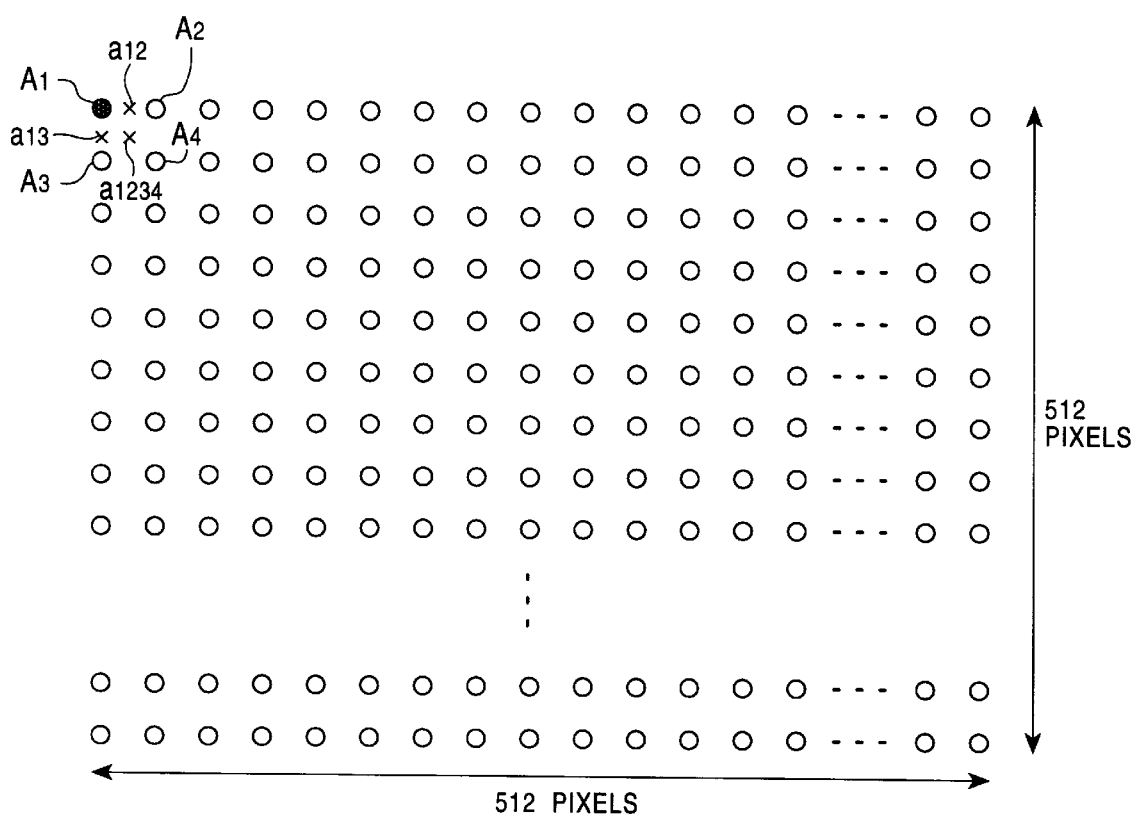
FIG. 3 is a diagram for explaining processing in the pixel-multiplied image forming circuit 3 shown in FIG. 1.
Figure 4:
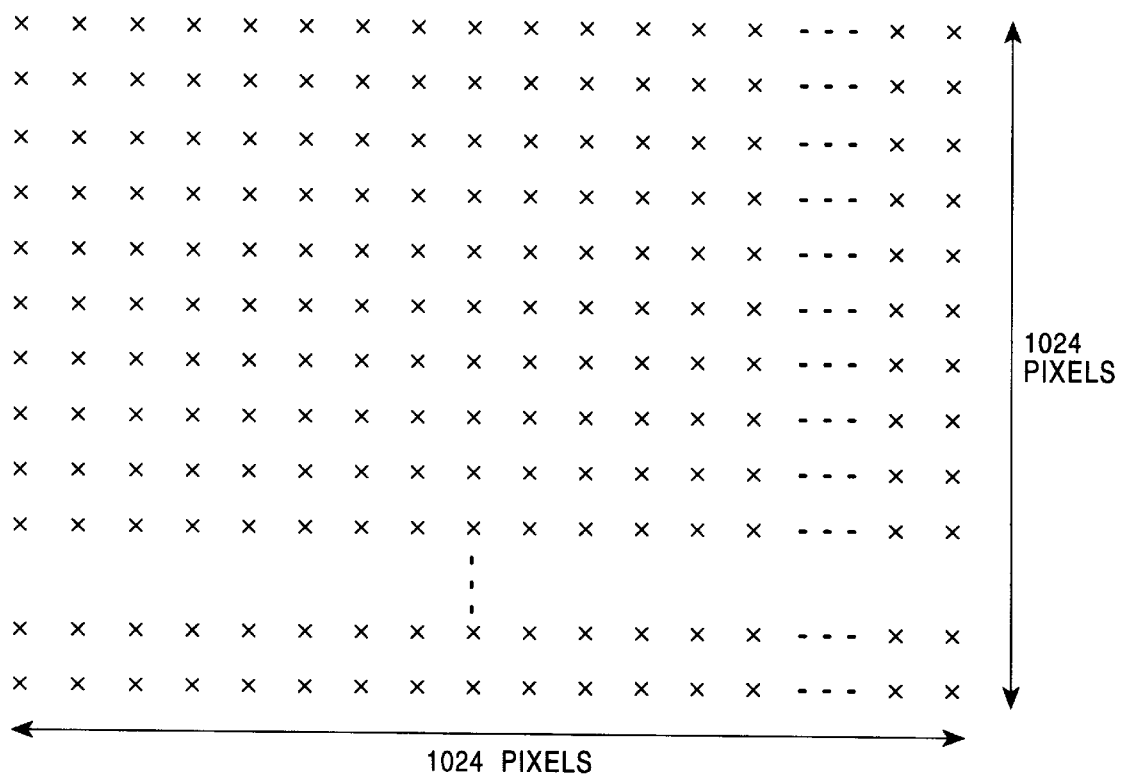
FIG. 4 is a diagram showing a pixel-multiplied image.

Referring also to FIG. 3, pixel $a_{12}$ of the pixel-multiplied image is the average of pixels $A_1$ and $A_2$ of the original image. Accordingly, the pixel forming circuit 12b reads out pixels $A_1$, and $A_2$ after completion of storage of pixel $A_2$ in the input image memory 2 subsequent to storage of pixel $A_1$.

The pixel forming circuit 12b then calculates the average of pixels $A_1$ and $A_2$ and outputs the calculation result to the memory 13b as pixel q(2x+1, 2y) of the pixel-multiplied image.

Further, referring to FIG. 3, pixel $a_{13}$ of the pixel-multiplied image is the average of pixels $A_1$ and $A_3$ of the original image. Accordingly, the pixel forming circuit 12c reads out pixels $A_1$ and $A_3$ after completion of storage of pixel $A_3$ in the input image memory 2 with storage of pixels corresponding to one line (pixels of the original image corresponding to one line) subsequent to storage of pixel $A_1$. The pixel forming circuit 12c then calculates the average of pixels $A_1$ and $A_3$ and outputs the calculation result to the memory 13c as pixel q(2x1, 2y+1) of the pixel-multiplied image.

Also, referring also to FIG. 3, pixel $a_{1234}$ of the pixel-multiplied image is the average of pixels $A_1$ to $A_4$ of the original image. Accordingly, the pixel forming circuit 12d reads out pixels $A_1$ to $A_4$ after completion of storage of these pixels. The pixel forming circuit 12d then calculates the average of pixels $A_1$ to $A_4$ and outputs the calculation result to the memory 13d as pixel q(2x+1, 2y+1) of the pixel-multiplied image.

On the other hand, in the delay circuits 11a to 11d of the address supply circuit 1, horizontal address HA and vertical address VA are respectively delayed by time periods required by the pixel forming circuits 12a to 12d to generate pixels q(2x, 2y), q(2x+1, 2y), q(2x, 2y+1), and q(2x+1, 2y+1) of the pixel-multiplied image, and are thereafter supplied to the memories 13a to 13d, respectively.

As a result, in the memories 13a to 13d, pixels q(2x, 2y), q(2x+1, 2y), q(2x, 2y+1), and q(2x+1, 2y+1) supplied from the pixel forming circuits 12a to 12d are respectively stored with the same address (x, y).

Next, at the time of reading, i.e., when the R/W signal designates reading, and when the selection flag designates the original image, the address supply circuit 1 directly supplies, to the address terminals of the input image memory 2, horizontal address HA and vertical address VA supplied to the address supply circuit 1. Then, the RMW circuit 5 sequentially reads out the pixels (pixel values) of the original image stored in the memory cells of the input image memory 2 designated by horizontal address HA and vertical address VA.

One frame of the original image formed of 512×512 pixels is read out from the input image memory 2 in the above-described manner, thus outputting the original image progressively scanned.

On the other hand, when the selection flag designates the pixel-multiplied image while the R/W signal designates reading, the address supply circuit 1 delays, in the delay circuits 11a to 11d, horizontal address HA and vertical address VA supplied to it by such amounts that the pixel-multiplied image can be output in the order according to the progressive scan, and outputs the delayed addresses to the address terminals of the memories 13a to 13d.

That is, the memories 13a to 13d have pixels q(2x, 2y), q(2x+1, 2y), q(2x, 2y+1), and q(2x+1, 2y+1) stored therein with the same address (x, y). In order to read out pixels q(2x, 2y), q(2x+1, 2y), q(2x, 2y+1), and q(2x+1, 2y+1) from the memories 13a and 13d in the order according to the progressive scan, therefore, it is necessary to supply, with respect to pixel q(2x, 2y), address (x, y) to the memory 13b with a delay corresponding to one pixel (one pixel of the pixel-multiplied image) from the moment at which address (x, y) is supplied to the memory 13a. It is also necessary to supply address (x, y) to the memory 13c with a delay corresponding to one line (1024 pixels of the pixel-multiplied image in this embodiment) from the moment at which address (x, y) is supplied to the memory 13a. Further, it is necessary to supply address (x, y) to the memory 13d with a delay corresponding to one line and one pixel (1025 pixels of the pixel-multiplied image in this embodiment) from the moment at which address (x, y) is supplied to the memory 13a.

In the delay circuits 11a to 11d, therefore, each of the combinations (HA, VA) of horizontal address HA and vertical address VA is delayed by the above-described time periods before being supplied to the address terminals of the memories 13a to 13d.

Thereafter, the RMW circuit 5 sequentially reads out the pixels of the pixel-multiplied image stored in the memory cells of the memories 13a to 13d designated by addresses from the delay circuits 11a to 11d.

Thus, one frame of the pixel-multiplied image formed of 1024× and 1024 pixels is read out from the pixel-multiplied image memory 4 (memories 13a to 13d), thereby outputting the pixel-multiplied image progressively scanned.

If the original image and the pixel-multiplied image have the same one-frame period, the number of pixels forming one frame of the pixel-multiplied image is the quadruple of the number of pixels forming one frame of the original image. At the time of reading the pixel-multiplied image, therefore, it is necessary to make the delay circuits 11a to 11d and the RMW circuit 5 operate in synchronization with a clock whose frequency is the quadruple of the frequency of the normal clock (hereinafter referred to as "quadruple clock" as occasion demands). For example, the quadruple clock may be generated on the basis of the normal clock by a PLL (phase lock loop) circuit incorporated in the address supply circuit 1 or RMW circuit 5.

As described above, a pixel-multiplied image is formed and stored in parallel with an original image, the pixel-multiplied image being formed by increasing the number of pixels of the original image. Therefore, in a case where enlargement of an original image is required, for example, in electronic zooming or the like, a pixel-multiplied image obtained as an image formed by enlarging the original image can be immediately provided by read out from the pixel-multiplied image memory 4.

Figure 6:
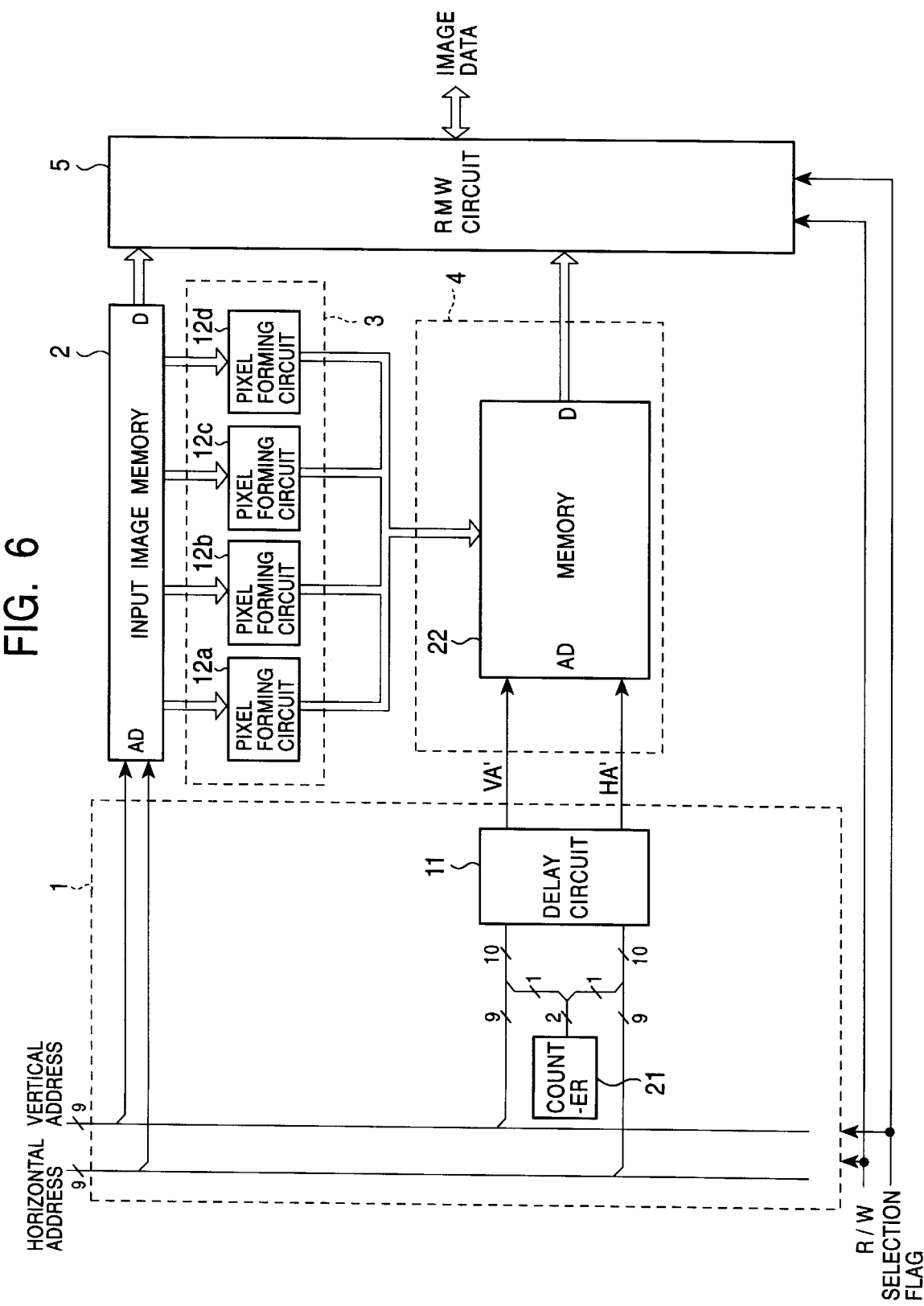
FIG. 6 is a block diagram showing a second detailed arrangement for the storage apparatus shown in FIG. 1.

FIG. 6 shows a second detailed arrangement for the storage apparatus shown in FIG. 1. In FIG. 6, portions corresponding to those shown in FIG. 5 are indicated by the same reference characters.

In this embodiment, an address supply circuit 1 is formed with a delay circuit 11 and a counter 21 included therein. The delay circuit 11 is arranged to delay addresses supplied to it by a necessary time period and to thereafter supply the delayed addresses to address terminals (AD) of a memory 22 forming a pixel-multiplied image memory 4. The counter 21 is a 2-bit counter or the like and is arranged to count, for example, a quadruple clock and to output a 2-bit count value.

Also, the address supply circuit 1 is arranged to form a 10-bit horizontal address HA' by adding the least significant bit (additional address signal) in the 2-bit count value output from the counter 21 to 9-bit horizontal address HA supplied to the address supply circuit 1, the added bit being set as the least significant bit of the horizontal address, and to supply the horizontal address HA' to an address terminal (AD) of the memory 22 through the delay circuit 11. Further, the address supply circuit 1 is arranged to form a 10-bit vertical address VA' by adding the most significant bit (additional address signal) in the 2-bit count value output by the counter 21 to 9-bit vertical address VA supplied to the address supply circuit 1, the added bit being set as the least significant bit of the vertical address, and to supply the vertical address VA' to an address terminal (AD) of the memory 22 through the delay circuit 11.

In the embodiment shown in FIG. 6, therefore, when address (x, y) is supplied to the input image memory 2, the address supply circuit 1 supplies addresses (2x, 2y), (2x+1, 2y), (2x, 2y+1), and (2x+1, 2y+1) to the memory 22 through the delay circuit 11.

The pixel-multiplied image memory 4 is formed of one memory 22, as described above, and the memory 22 is arranged to store, with addresses (2x, 2y), (2x+1, 2y), (2x, 2y+1), and (2x+1, 2y+1) supplied from the delay circuit 11, pixels q(2x, 2y), q(2x+1, 2y), q(2x, 2y+1), and q(2x+1, 2y+1) of a pixel-multiplied image supplied from pixel forming circuits 12a to 12d. Accordingly, the memory 22 has a capacity for storing 1024×1024 pixels forming one frame of a pixel-multiplied image.

The memory 22 is also arranged to read out, from addresses (2x, 2y), (2x+1, 2y), (2x, 2y+1), and (2x+1, 2y+1) supplied from the delay circuit 11, pixels q(2x, 2y), q(2x+1, 2y), q(2x, 2y+1), and q(2x+1, 2y+1) of a pixel-multiplied image stored with these addresses, and to supply the pixels to RMW circuit 5.

The operation of this embodiment will next be described.

First, when image data is written, that is, the R/W signal designates writing, an original image is written in the input image memory 2 in the same manner as in the arrangement shown in FIG. 5.

When the pixels of the original image necessary for generating pixels q(2x, 2y), q(2x+1, 2y), q(2x, 2y+1), and q(2x+1, 2y+1) forming a pixel-multiplied image are stored in the input image memory 2, the pixel forming circuits 12a to 12d of the pixel-multiplied image forming circuit 3 respectively generate pixels q(2x, 2y), q(2x+1, 2y), q(2x, 2y+1), and q(2x+1, 2y+1) of the pixel-multiplied image in the same manner as in the arrangement shown in FIG. 5, and sequentially supply these pixels to the memories 22.

On the other hand, in the address supply circuit 1, the least significant bit or the most significant bit in the 2-bit count value output from the counter 21 is added to 9-bit horizontal address HA or vertical address VA supplied to the address supply circuit 1, the added bit being set as the least significant bit of the horizontal or vertical address. 10-bit horizontal address HA' and 10-bit vertical address VA' are thereby formed. That is, four addresses (2x, 2y), (2x+1, 2y), (2x, 2y+1), and (2x+1, 2y+1) are thereby formed when (x, y) is supplied to the address supply circuit 1 as a combination (HA, VA) of horizontal address HA and vertical address VA. These addresses (2x, 2y), (2x+1, 2y), (2x, 2y+1), and (2x+1, 2y+1) are respectively delayed in the delay circuit 11 by time periods required by the pixel forming circuits 12a to 12d to generate pixels q(2x, 2y), q(2x+1, 2y), q(2x, 2y+1), and q(2x+1, 2y+1) of the pixel-multiplied image after pixel p (x, y) of the original image has been stored in the input image memory 2. The delayed addresses are supplied to the memory 22.

Consequently, in the memory 2, pixels q(2x, 2y), q(2x+1, 2y), q(2x, 2y+1), and q(2x+1, 2y+1) supplied from the pixel forming circuits 12a to 12d are respectively stored with addresses (2x, 2y), (2x+1, 2y), (2x, 2y+1), and (2x+1, 2y+1).

Next, at the time of reading, i.e., when the R/W signal designates reading, and when the selection flag designates the original image, the original image is read out from the input image memory 2 in the same manner as in the arrangement shown in FIG. 5, and the original image progressively scanned is output from the RMW circuit 5.

When the selection flag designates the pixel-multiplied image while the R/W signal designates reading, the address supply circuit 1 forms 10-bit horizontal address HA' and 10-bit vertical address VA', i.e., addresses (2x, 2y), (2x+1, 2y), (2x, 2y+1), and (2x+1, 2y+1), in the above-described manner, and outputs the addresses to the delay circuit 11. In the delay circuit 11, addresses (2x, 2y), (2x+1, 2y), (2x, 2y+1), and (2x+1, 2y+1) are delayed so that the pixel-multiplied image can be output in the order according to the progressive scan, and are thereafter supplied to the address terminals of the memory 22.

That is, when addresses (2x, 2y), (2x+1, 2y), (2x, 2y+1), and (2x+1, 2y+1) are supplied to the memory 22, pixels q(2x, 2y), q(2x+1, 2y), q(2x, 2y+1), and q(2x+1, 2y+1) are read out. In order to read out these pixels q(2x, 2y), q(2x+1, 2y), q(2x, 2y+1), and q(2x+1, 2y+1) in the order according to the progressive scan, it is necessary to supply, with respect to pixel q(2x, 2y) stored with address (2x, 2y), address (2x+1, 2y) with a delay corresponding to one pixel (one pixel of the pixel-multiplied image) from the moment at which address (2x, 2y) is supplied. It is also necessary to supply address (2x, 2y+1) with a delay corresponding to one line (1024 pixels of the pixel-multiplied image in this embodiment) from the moment at which address (2x, 2y) is supplied. Further, it is necessary to supply address (2x+1, 2y+1) with a delay corresponding to one line and one pixel (1025 pixels of the pixel-multiplied image in this embodiment) from the moment at which address (2x, 2y) is supplied.

In the delay circuit 11, therefore, each of addresses (2x, 2y), (2x+1, 2y), (2x, 2y+1), and (2x+1, 2y+1) is supplied to the address terminals of the memory 22 after being delayed by the above-described time period with respect to the moment at which address (2x, 2y) is output.

The RMW circuit 5 reads out the pixels of the pixel-multiplied image stored in the memory cells of the memory 22 designated by addresses from the delay circuit 11.

Thus, one frame of the pixel-multiplied image formed of 1024× and 1024 pixels is read out from the pixel-multiplied image memory 4 (memory 22), thereby outputting the pixel-multiplied image progressively scanned.

Also in the embodiment shown in FIG. 6, if the original image and the pixel-multiplied image have the same one-frame period, it is necessary to make the delay circuit 11 and the RMW circuit 5 operate in synchronization with the quadruple clock when the pixel-multiplied image is read out.

As described above, in the embodiment shown in FIG. 6, a pixel-multiplied image is also formed and stored in parallel with an original image, the pixel-multiplied image being formed by increasing the number of pixels of the original image. Therefore, in a case where enlargement of an original image is required, for example, in electronic zooming or the like, a pixel-multiplied image obtained as an image formed by enlarging the original image can be immediately provided by being read out from the pixel-multiplied image memory 4.

In the pixel-multiplied image forming circuit 3, in the above-described case, a pixel-multiplied image is formed by performing weighting addition using an original image. However, a pixel-multiplied can be formed by a different method. For example, a pixel-multiplied image can be formed by classification and adaptation processing or the like.

Figure 7:
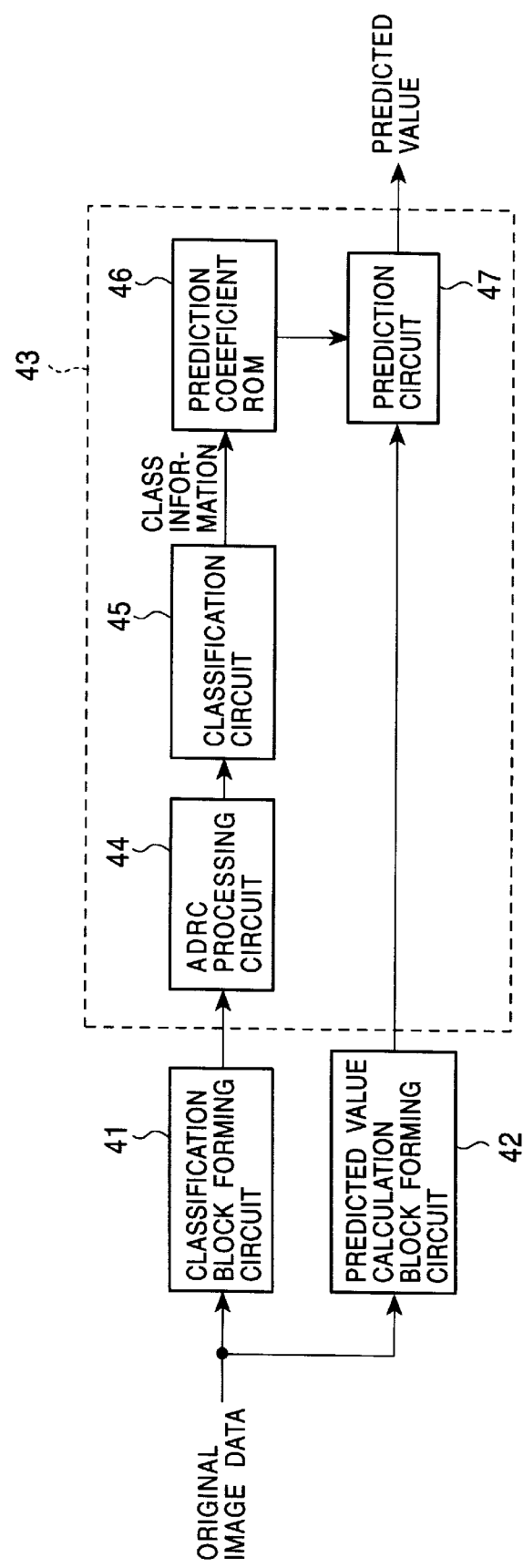
FIG. 7 is a block diagram showing a detailed arrangement for the pixel-multiplied image forming circuit 3 shown in FIG. 1.

FIG. 7 shows the configuration of an example of pixel-multiplied image forming circuit 3 (each of pixel forming circuits 12a to 12d) in a case where a pixel-multiplied image is formed by classification and adaptation processing.

Each of a classification block forming circuit 41 and a predicted value calculation block forming circuit 42 is supplied with image data of an original image (original image data) stored in the input image memory 2. The classification block forming circuit 41 is arranged to form, from original image data, a classification block about one of original image data items observed (observed original image data item), which is a unit for classification of the original image data into predetermined classes according to characters of the original image data.

Figure 8:
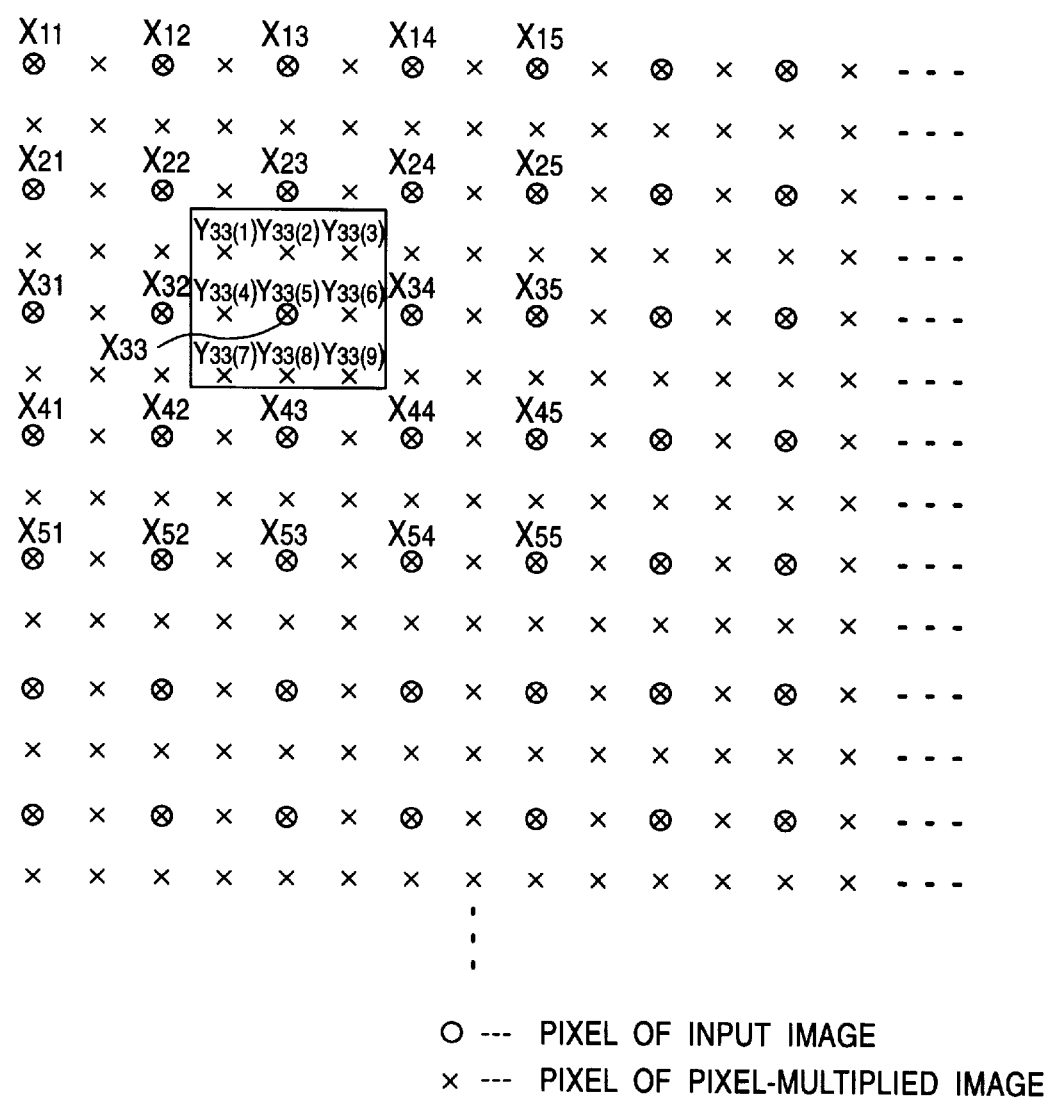

That is, if, referring to FIG. 8, original image data at the ith position from the uppermost position and at the jth position from the leftmost position (a pixel (pixel value) constituting an original image) (a portion indicated by symbol ○ in the figure) is $X_{ij}$, the classification block forming circuit 41 forms a classification block of, for example, observed original image data $X_{ij}$ and eight pixels $X_{(i-1)(j-1)}$, $X_{(i-1)j}$, $X_{(i-1)(j-1)}$, $X_{i(j-1)}$, $X_{i(j-1)}$, $X_{(i-1)(j-1)}$, $X_{(i-1)}$, and $X_{(i-1)(j-1)}$, each of which is adjacently located off to the upper left of, above, off to the upper right of, on the left-hand side of, on the right-side of, off to the lower left of, below, or off to the lower right of observed original image data $X_{ij}$, a total of nine pixels. This classification block is supplied to the classification and adaptation processing circuit 43.

In this case, the classification block is formed as a square block formed of 3×3 pixels (the number of columns×the number of rows). However, it is not necessary to limit the shape of the classification block to a square. The classification block may be formed into any other shape, e.g., a rectangular shape, or a crisscross shape. Also, the number of pixels forming the classification block is not limited to nine pixels in a 3×3 array.

The predicted value calculation block forming circuit 42 is arranged to form original image data into predicted value calculation blocks each defined about observed original image data item as a unit for calculating predicted values of pixels (pixel values) constituting a pixel-multiplied image. That is, if, referring to FIG. 8, nine pixels in a 3×3 array (indicated by symbol x in the figure) about an original image data item $X_{ij}$ (indicated by symbol ○ in the figure) are represented by $Y_{ij}(1)$, $Y_{ij}(2)$, $Y_{ij}(3)$, $Y_{ij}(4)$, $Y_{ij}(5)$, $Y_{ij}(6)$, $Y_{ij}(7)$, $Y_{ij}(8)$, $Y_{ij}(9)$ along the direction from left to right and along the direction from top to bottom, then the predicted value calculation block forming circuit 42 forms, for example, a 5×5 square predicted value calculation block about observed original image data item $X_{ij}$ for calculation of predicted values of pixels $Y_{ij}(1)$ to $Y_{ij}(9)$, i.e., a block formed of 25 pixels: $X_{(i-2)(j-2)}$, $X_{(i-2)(j-1)}$, $X_{(i-2)j}$, $X_{(i-2)(j+1)}$, $X_{(i-2)(j+2)}$, $X_{(i-1)(j-2)}$, $X_{(i-1)j}$, $X_{(i-1)(j+2)}$, $X_{(i-1)(j+2)}$, $X_{i(j-2)}$, $x_{1(j-1)}$, $X_{ij}$, $X_{i(j+1)}$, $X_{i(j+2)}$, $X_{(i+2)(j-2)}$, $X_{(i+1)(j-1)}$, $X_{(i+1)j}$, $X_{(i+1)(j+1)}$, $X_{(i+1)(j+2)}$, $X_{(i+2)(j-2)}$, $X_{(i+2)(j+1)}$, and $X_{(i+2)(j+2)}$.

More specifically, for calculation of, for example, nine pixels $Y_{33}(1)$ to $Y_{33}(9)$ in a pixel-multiplied image surrounded by a square in FIG. 8, a prediction value calculation block is formed of pixels $X_{11}$, $X_{12}$, $X_{14}$, $X_{15}$, $X_{21}$, $X_{22}$, $X_{23}$, $X_{24}$, $X_{25}$, $X_{31}$, $X_{32}$, $X_{33}$, $X_{34}$, $X_{35}$, $X_{41}$, $X_{42}$, $X_{43}$, $X_{44}$, $X_{45}$, $X_{51}$, $X_{52}$, $X_{53}$, $X_{54}$, and $X_{55}$ ($X_{33}$ being an observed original image data item in this case).

The predicted value calculation block obtained by the predicted value calculation block forming circuit 42 is supplied to the classification and adaptation processing circuit 43.

The number of pixels and the shape of the predicted value calculation block are not limited to those described above, as are the number of pixels and the shape of the classification block. However, it is desirable that the number of pixels forming the predicted value calculation block be greater than the number of pixels forming the classification block.

In forming blocks in the above-described manner (also in processings other than the processing for forming blocks), there is a possibility of absence of conformable pixels at the frame edge of an image. In such a case, processing is performed by assuming that the same pixels as those forming the frame edge exist outside the frame edge.

The classification and adaptation processing circuit 43 is formed of an adaptive dynamic range coding (ADRC) processing circuit, a classification circuit 45, a prediction coefficient ROM 46, and a prediction circuit 47, and is arranged to perform classification and adaptation processing.

Classification and adaptation processing is processing for classifying input signals into several classes according to characters of the input signals and for performing adaptation processing suitable for each class, and consists mainly of classification processing and adaptation processing.

Classification processing and adaptation processing will now be described briefly.

Classification processing will first be described.

Figure 9A:
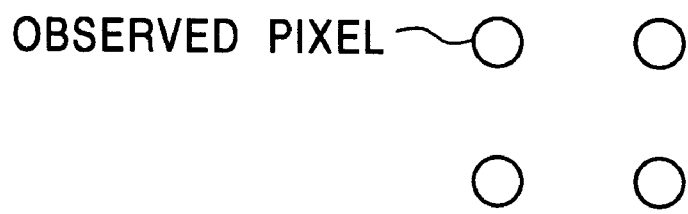
FIG. 9 is a diagram for explaining classification processing.
Figure 9B:
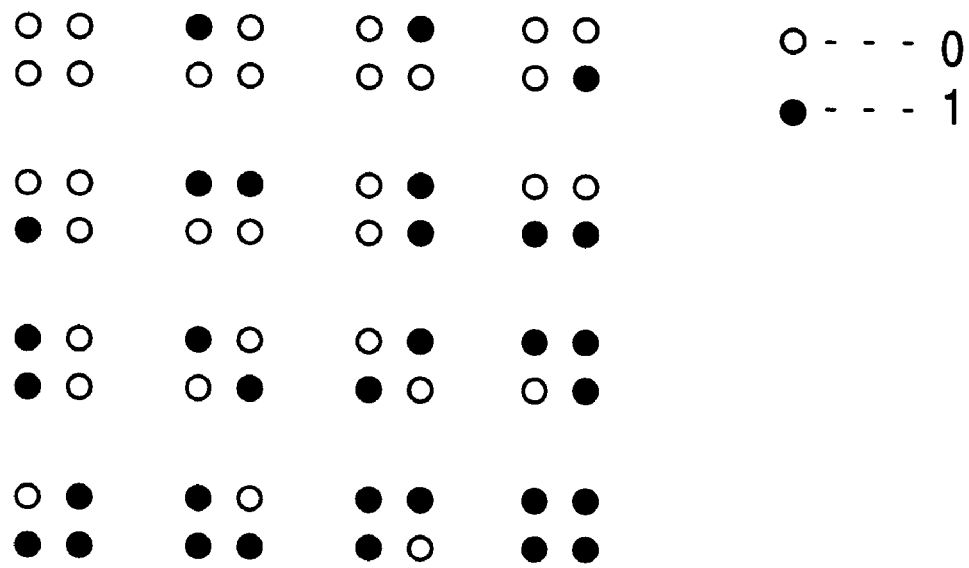

For example, as shown in FIG. 9A, an observed pixel and three pixels adjacent to the observed pixel form a block of 2×2 pixels (classification block), and each pixel is expressed by one bit (having one of two levels of 0 and 1). In such a situation, there are 16 $(=(2^1)^4)$ patterns for the block formed of four pixels in the 2×2 array containing the observed pixel with respect to distributions of the levels of the pixels, as shown in FIG. 9B. In this example, the observed pixel can be classified into one of 16 patterns. Classification using such patterns is performed as classification processing in the classification circuit 45.

Classification processing may also be performed by considering the activity of an image (image in a block) (complexity of the image) (the intensity of change), etc.

In this embodiment, eight bits are assigned to each of pixels forming an original image. Also, in this embodiment, a classification block formed of nine pixels in a 3×3 array is used, as mentioned above. If classification processing is performed with respect to such a classification block, an extremely larger number of classes, i.e., $(2^8)^9$, are used.

In this embodiment, therefore, ADRC processing is performed in the ADRC processing circuit 44 with respect to a classification block, such that the number of pixels forming the classification block is reduced, thereby reducing the number of classes.

Figure 10A:
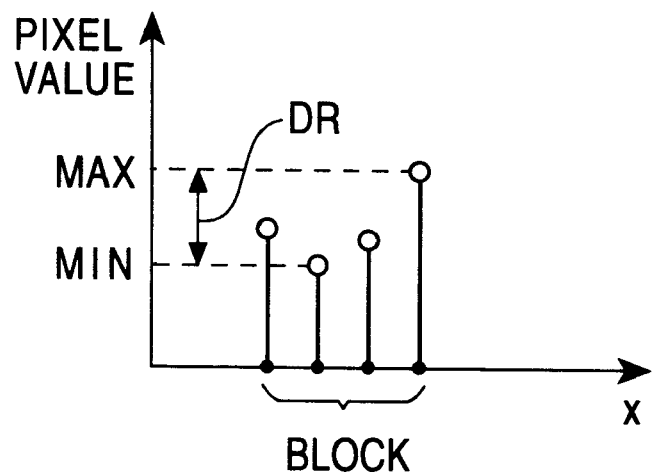
FIG. 10 is a diagram for explaining ADRC processing.

That is, for ease of explanation, processing of a block formed of, for example, four pixels arranged along a line, as shown in FIG. 10A, will be discussed. In ADRC processing of this block, the maximum MAX and the minimum MIN of the pixel values are detected. Then, DR=MAX−MIN is set as a local dynamic range of the block, and the pixel value of each pixel constituting the block is requantized into K bits based on this dynamic range DR.

Figure 10B:
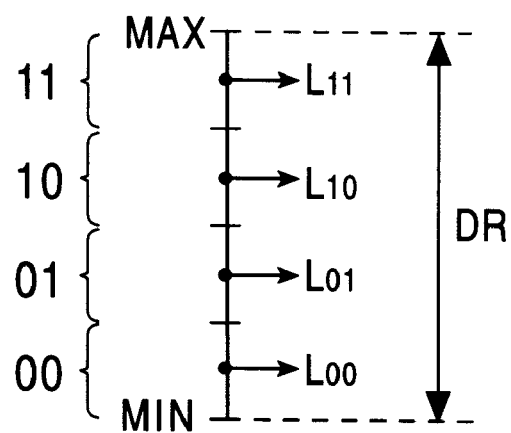

That is, the minimum value MIN is subtracted from each pixel value in the block and the difference obtained by this subtraction is divided by $DR/2^K$. The pixel value is converted into a code (ADRC code) corresponding to the result of this division. For example, if K=2, the magnitude of the divided value is determined with respect to the domains defined by dividing the dynamic range DR by 4 $(=2^2)$. As shown in FIG. 10(B), the pixel value is encoded into two bits, e.g., 00B, 01B, 10B, or 11B (B denoting that the value is binary) if the divided value belongs to the domain lowest in level, the domain second in level from the lowest, the domain third in level from the lowest, or the domain highest in level. Decoding of such a code is performed in such a manner that ADRC code 00B, 01B, 10B, or 11B is converted into the middle value $L_{00}$, of the lowest level domain, the middle value $L_{01}$, of the second level domain, the middle value $L_{10}$ of the third level domain, or the middle value $L_{11}$, of the highest level domain, and the minimum value MIN is added to the converted value.

Such ADRC processing is called non-edge matching. Japanese Patent Laid-Open Publication 53778/1991 of the application made by the applicant of the present invention and other documents disclose details of such ADRC processing.

If ADRC processing is performed for requantization with a number of bits smaller than the number of bits assigned to each pixel constituting the block, the number of classes can be reduced as described above. Such ADRC processing is performed in the ADRC processing circuit 44.

In this embodiment, classification processing is performed in the classification circuit 45 based on the ADRC code output from the ADRC processing circuit 44. Classification processing, however, may be performed to process data which has undergone, for example, predictive coding (DPCM), block truncation coding (BTC), vector quantization (VQ), discrete cosine transform (DCT), Hadamard transform or the like.

Adaptation processing will next be described.

A process will be discussed in which, for example, a predicted value E[y] of a pixel (pixel value) y of an image (corresponding to the above-mentioned pixel-multiplied image) is obtained by using a linear combination model prescribed with a linear combination of predetermined prediction coefficients $w_1$, $w_2$, . . . and several pixels (pixel values) $x_1$, $x_2$, . . . constituting another image (an image having a smaller number of pixels) (an image corresponding to the above-mentioned original image) obtained by thinning out the pixels of the above-mentioned image (hereinafter referred to as "learning data" as occasion demands). In this case, the predicted value E[y] can be represented by the following equation:

$$E[y]=w_1x_1+w_2x_2+\ldots \quad (1)$$

For generalization, a matrix W formed of a set of prediction coefficients w, a matrix X formed of a set of learning data, and a matrix Y' formed of a set of prediction values E[y] are defined as follows.

$$X = \begin{bmatrix} x_{11} & x_{12} & \cdots & x_{1n} \\ x_{21} & x_{22} & \cdots & x_{2n} \\ \cdots & \cdots & \cdots & \cdots \\ x_{m1} & x_{m2} & \cdots & x_{mn} \end{bmatrix}$$

$$W = \begin{bmatrix} w_1 \\ w_2 \\ \cdots \\ w_n \end{bmatrix}, Y' = \begin{bmatrix} E[y_1] \\ E[y_2] \\ \cdots \\ E[y_3] \end{bmatrix}$$

Then, the following observation equation is formed.

$$XW=Y' \quad (2)$$

Calculating predicted value E[y] close to pixel value y of the entire image by applying the least square method to this observation equation will be considered. In this case, if a matrix Y formed of a set of pixel values y of the entire image (hereinafter referred to as "teacher data" as occasion demands), and a matrix E formed of a set of remainders e of predicted values E[y] with respect to pixel values y of the entire image are defined by $$E = \begin{bmatrix} e_1 \\ e_2 \\ \cdots \\ e_m \end{bmatrix}, Y = \begin{bmatrix} y_1 \\ y_2 \\ \cdots \\ y_n \end{bmatrix}$$

the following remainder equation is formed from equation (2).

$$XW=Y+E \quad (3)$$

In this case, the prediction coefficients $w_i$ for obtaining predicted value E[y] close to the pixel value y of the entire image can be obtained by minimizing a square error:

$$\sum_{i=1}^{m} e_i^2$$

Accordingly, if the result of differentiation of the above square error with respect to prediction coefficients $w_i$ becomes zero, that is, if prediction coefficients $w_i$ satisfy an equation shown below, prediction coefficients $w_1$, are optimum values for obtaining predicted value E[y] close to pixel value y of the entire image.

$$e_1\frac{\partial e_1}{\partial w_i} + e_2\frac{\partial e_2}{\partial w_i} + \cdots + e_m\frac{\partial e_m}{\partial w_i} = 0 \ (i=1, 2, \cdots, n) \quad (4)$$

Equation (3) is differentiated with respect to prediction coefficients $w_i$ to form the following equations:

$$\frac{\partial e_i}{\partial w_i} = x_{i1}, \frac{\partial e_1}{\partial w_2} = x_{i2}, \cdots, \frac{\partial e_1}{\partial w_n} = x_{in}, (i=1, 2, \cdots, m) \quad (5)$$

Equations (6) are obtained from equations (4) and (5).

$$\sum_{i=1}^{m} e_i x_{i1} = 0, \sum_{i=1}^{m} e_i x_{i2} = 0, \cdots \sum_{i=1}^{m} e_i x_{in} = 0 \quad (6)$$

Further, by considering the relationship between learning data x, a set of prediction coefficients w, teacher data y, and remainders e in equation (3), the following normal equations are obtained from equations (6).

$$\begin{cases} \left(\sum_{i=1}^{m} x_{i1}x_{i1}\right)w_1 + \left(\sum_{i=1}^{m} x_{i1}x_{i2}\right)w_2 + \cdots + \left(\sum_{i=1}^{m} x_{i1}x_{in}\right)w_n = \left(\sum_{i=1}^{m} x_{i1}y_i\right) \\ \left(\sum_{i=1}^{m} x_{i2}x_{i1}\right)w_1 + \left(\sum_{i=1}^{m} x_{i2}x_{i2}\right)w_2 + \cdots + \left(\sum_{i=1}^{m} x_{i2}x_{in}\right)w_n = \left(\sum_{i=1}^{m} x_{i2}y_i\right) \\ \cdots \\ \left(\sum_{i=1}^{m} x_{in}x_{i1}\right)w_1 + \left(\sum_{i=1}^{m} x_{in}x_{i2}\right)w_2 + \cdots + \left(\sum_{i=1}^{m} x_{in}x_{in}\right)w_n = \left(\sum_{i=1}^{m} x_{in}y_i\right) \end{cases} \quad (7)$$

The same number of equations (7) as the number of sets of prediction coefficients w to be obtained can be formed. Consequently, an optimum set of predinction coefficients w can be obtained by solving equations (7). To solve equations (7), the Gauss-Jordan elimination method or the like can be used.

As described above, in adaptation processing, a set of optimum prediction coefficients w is obtained with respect to each class, and predicted value E[y] close to the pixel value of the entire image is obtained by equation (1) using the set of prediction coefficients w. This adaptation processing is performed by the prediction coefficient ROM 46 and the prediction circuit 47.

That is, the prediction coefficient ROM 46 stores sets of prediction coefficients with respect to classes previously obtained by performing learning (described below). The prediction coefficient ROM 46 is arranged to receive class information output from the classification circuit 45, to read out the set of prediction coefficients stored with addresses corresponding to the class information (the set of prediction coefficients corresponding to the class information), and to supply the set of prediction coefficients to the prediction circuit 47.

The prediction circuit 47 is arranged to calculate the linear equation (1) by using a predicted value calculation block of 5×5 pixels supplied from the predicted value calculation block forming circuit 43 and a set of prediction coefficients supplied from the prediction coefficient ROM 46, thereby obtaining predicted values of 3×3 pixels of a pixel-multiplied image.

Adaptation processing differs from interpolation processing such as the above-described weighting addition in that components not contained in a thinned-out image but contained in the entire image are reproduced. That is, adaptation processing is the same as interpolation processing using an interpolation filter if it is only seen through equation (1), but a set of prediction coefficients w corresponding to tap coefficients of the interpolation filter are obtained by a kind of learning using teacher data y to enable the components contained in the entire image to be reproduced. Considering this point, it can be said that adaptation processing has an effect of creating an image.

Processing in the pixel-multiplied image forming circuit 3 shown in FIG. 7 will next be described.

First, in the pixel-multiplied image forming circuit 3, block of original image data is formed. That is, in the classification block forming circuit 41, image data is formed into a classification block of 3×3 pixels about an observed original image data item, and this block is supplied to the classification and adaptation processing circuit 43. In the predicted value calculation block forming circuit 42, original image data is formed into a predicted value calculation block of 5×5 pixels about the observed original image data item, and this block is supplied to the classification and adaptation processing circuit 43.

In the classification and adaptation processing circuit 43, the classification block and the predicted value calculation block are supplied to the ADRC processing section 44 and to the adaptation processing circuit 46, respectively.

Receiving the classification block, the ADRC processing circuit 44 processes the classification block by, for example, 1-bit ADRC (ADRC for 1-bit requantization) processing to covert (encode) the original image data into 1-bit data, and outputs the encoded data to the classification circuit 45. In the classification circuit 45, the classification block processed by ADRC processing undergoes classification processing. That is, the state of level distribution of the pixels forming the classification block processed by ADRC processing is detected and the class to which the classification block belongs is determined. The result of this class determination is supplied as class information to the prediction coefficient ROM 46.

In this embodiment, classification blocks each formed of nine pixels in a 3×3 array and processed by 1-bit ADRC processing undergo classification processing. Accordingly, each classification block is classified into one of 512 (=$(2^1)^9$) classes.

When the prediction coefficient ROM 46 receives class information, it reads out a set of prediction coefficients corresponding to the class information from the sets of prediction coefficients stored with respect to classes, and supplies the read-out coefficients to the prediction circuit 47. In the prediction circuit 47, adaptation processing is performed by using the set of prediction coefficients from the prediction coefficient ROM 46 and the predicted value calculation block from the predicted value calculation block forming circuit 42, that is, calculation shown by equation (1) is performed to obtain predicted values of the pixels of a pixel-multiplied image.

Figure 11:
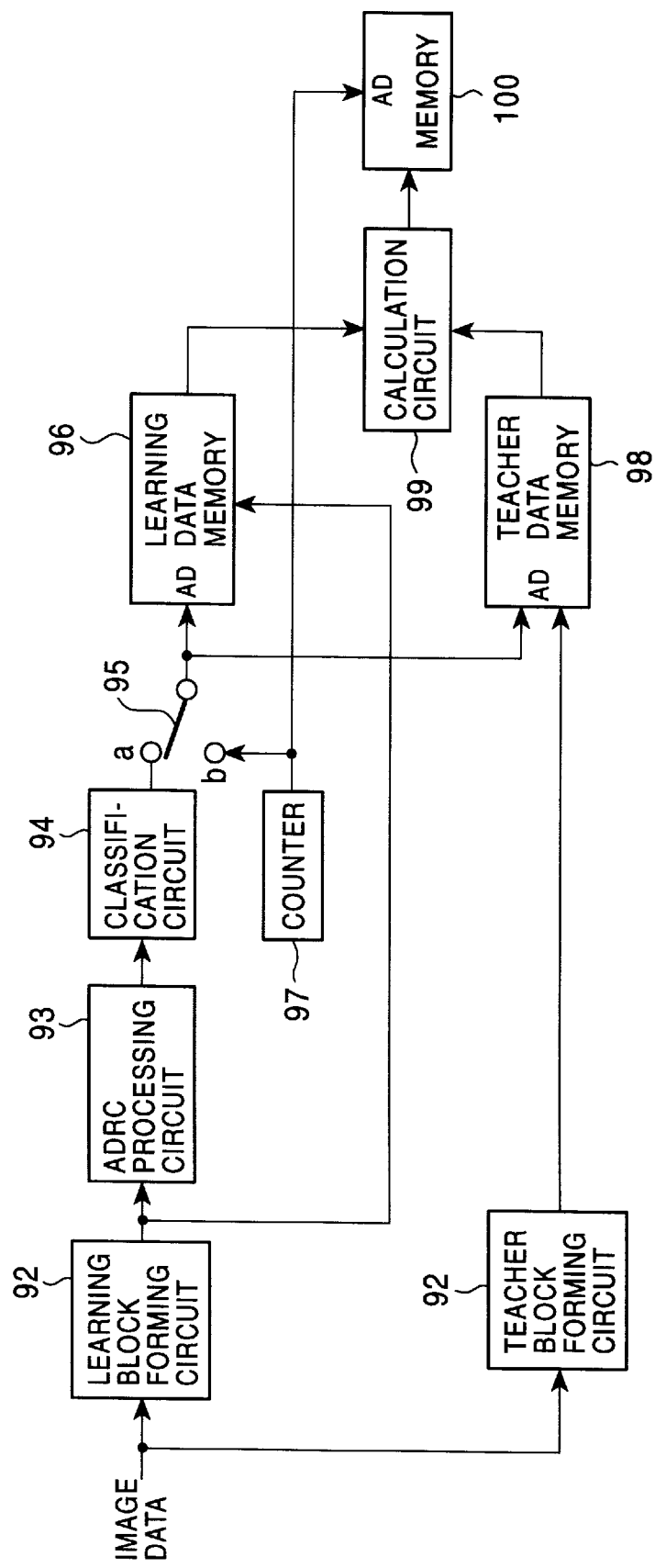
FIG. 11 is a block diagram showing the configuration of an image processor which performs learning for obtaining prediction coefficients.

FIG. 11 shows the configuration of an image processor which performs learning for obtaining sets of prediction coefficients stored in the prediction coefficient ROM 46 shown in FIG. 7.

Learning image data (a learning pixel-multiplied image) for obtaining a set of prediction coefficients related to each class is supplied to a learning block forming circuit 91 and a teacher block forming circuit 92.

The learning block forming circuit 91 extracts, for example, 5×5 pixels in the positional relationship indicated by symbols ○ in FIG. 8 (corresponding to pixels forming an original image) from the image data input to it and supplies, as a learning block, the block formed of these 25 pixels to an ADRC processing 93 and to a learning data memory 96.

In the teacher block forming circuit 92, a block formed of, for example, nine pixels in a 3×3 array is formed from the supplied image data. The block formed of nine pixels is supplied as a teacher block to a teacher data memory 98.

In a case where in the learning block forming circuit 91 a block formed of 25 pixels in the positional relationship indicated by symbols ○ in FIG. 8, i.e., pixels $X_{11}$, $X_{12}$, $X_{14}$, $X_{15}$, $X_{21}$, $X_{22}$, $X_{23}$, $X_{24}$, $X_{25}$, $X_{31}$, $X_{32}$, $X_{33}$, $X_{34}$, $X_{35}$, $X_{41}$, $X_{42}$, $X_{43}$, $X_{44}$, $X_{45}$, $X_{51}$, $X_{52}$, $X_{53}$, $X_{54}$, and $X_{55}$, is formed, a teacher block of 3×3 pixels surrounded by a square in FIG. 8 is formed in the teacher block forming circuit 92.

The ADRC processing circuit 93 extracts, for example, central nine pixels (3×3 pixels) from 25 pixels forming the learning block, and processes this block formed of nine pixels by 1-bit ADRC processing, as does the ADRC processing circuit 44 shown in FIG. 7. The block of 3×3 pixels processed by ADRC processing is supplied to the classification circuit 94. In the classification circuit 94, the block from the ADRC processing circuit 93 undergoes classification processing, as does the block in the classification circuit 45 shown in FIG. 7. Class information thereby obtained is supplied to the learning data memory 96 and to the teacher data memory 98 via a terminal a of a switch 95.

In the learning data memory 96 or teacher data memory 98, the learning block from the learning block forming circuit 91 or the teacher block from the teacher block forming circuit 92 is stored with the address corresponding to the class information supplied to the memory.

In a case where in the learning data memory 96 a block formed of 5×5 pixels indicated by symbols ○ in FIG. 8, i.e., pixels $X_{11}$, $X_{12}$, $X_{14}$, $X_{15}$, $X_{21}$, $X_{22}$, $X_{23}$, $X_{24}$, $X_{25}$, $X_{31}$, $X_{32}$, $X_{33}$, $X_{34}$, $X_{35}$, $X_{41}$, $X_{42}$, $X_{43}$, $X_{44}$, $X_{45}$, $X_{51}$, $X_{52}$, $X_{53}$, $X_{54}$, and $X_{55}$, is stored as a learning block with a certain address, a block of 3×3 pixels surrounded by a square in FIG. 8 (indicated by symbols x in the figure) is stored as a teacher block in the teacher data memory 98 with the same address as that in the learning data memory 96.

The same processing is repeated with respect to all prepared learning images. Learning blocks and teacher blocks each formed of nine pixels for enabling calculation of predicted values in the pixel-multiplied image forming circuit shown in FIG. 7 by using the predicted value calculation block formed of 25 original image data items having the same positional relationship with the 25 pixels forming the corresponding learning block are stored with the same addresses in the learning data memory 96 and the teacher data memory 98.

The learning data memory 96 and teacher data memory 98 are arranged to store a plurality of information items with the same address, thereby enabling a plurality of leaning blocks and a plurality of teacher blocks to be stored with the same address.

After learning blocks and teacher blocks with respect to all the learning images have been stored in the learning data memory 96 and the teacher data memory 98, the switch 95, which has selected the terminal a, is changed to a terminal b to enable an output from a counter 97 to be supplied as an address to the learning data memory 96 and to the teacher data memory 98. The counter 97 counts a predetermined clock and outputs a count value. In the learning data memory 96 or the teacher data memory 98, the learning data block or teacher block corresponding to the count value is supplied to a calculation circuit 99.

Accordingly, a set of learning blocks and a set of teacher blocks of the class corresponding to the count value of the counter 97 are supplied to the calculation circuit 99.

When the calculation circuit 99 receives a set of learning blocks and a set of teacher blocks with respect to a certain class, it calculates, by the least squares method, a set of prediction coefficients which minimizes the error.

That is, for example, if the pixel values of the pixels forming a learning block are $x_1, x_2, x_3, \ldots$, and if prediction coefficients to be obtained are $w_1, w_2, w_3, \ldots$, it is necessary for prediction coefficients $w_1, w_2, w_3, \ldots$ to satisfy the following equation in order to obtain the pixel value y of one pixel constituting the teacher block by linear combination of these values.

$$y = w_1 x_1 + w_2 x_2 + w_3 x_3 +$$

In the calculation circuit 99, prediction coefficients $w_1, w_2, w_3, \ldots$ which minimize the square error of the predicted value $w_1 x_1 + w_2 x_2 + w_3 x_3 + \ldots$ from the true value y can be obtained from learning blocks of the same class and the corresponding teacher blocks by solving the normal equations represented by equations (7) shown above. Accordingly, this processing may be performed with respect to classes to form sets of prediction coefficients related to the classes.

The set of prediction coefficients obtained with respect to each class in the calculation circuit 99 is supplied to a memory 100. To the memory 100, the count value from the counter 97 is supplied as well as the set of prediction coefficients from the calculation circuit 99. In the memory 100, the set of prediction coefficients from the calculation circuit 99 is stored with addresses according to the count value from the counter 97.

Thus, the set of prediction coefficients most suitable for predicting 3×3 pixels of the block of each class is stored in the memory 100 with the address corresponding to the class.

Sets of prediction coefficients stored in the memory 100 with respect to classes in the above-described manner are stored in the prediction coefficient ROM 46 shown in FIG. 7.

In this embodiment, a pixel-multiplied image in which the number of pixels in each of the horizontal and vertical directions is twice that of an original image is stored in the pixel-multiplied image memory 4. However, the number of pixels forming a pixel-multiplied image stored in the pixel-multiplied image memory 4 is not limited to this.

A plurality of pixel-multiplied image memories 4 may be provided to store pixel-multiplied images having different numbers of pixels each greater than that of an original image.

In this embodiment, addresses obtained by processing horizontal address HA and vertical address VA supplied to the input image memory 2 are supplied to the pixel-multiplied image memory 4. Alternatively, the pixel-multiplied image memory 4 may be supplied with independent addresses prepared separately from horizontal address HA and vertical address VA supplied to the input image memory 2 to accessed.

Also, in this embodiment, each of the input image memory 2 and the pixel-multiplied image memory 4 is accessed by being supplied with horizontal and vertical addresses respectively corresponding to horizontal and vertical positions of pixels forming an image. However, an address with respect to time, for example, may also be supplied to each of the input image memory 2 and the pixel-multiplied image memory 4. In such a case, a pixel-multiplied image is formed by using pixels of an original image distributed with time as well as pixels of the original image distributed in horizontal and vertical spatial directions.

Further, it is not necessary for the input image memory 2 and the pixel-multiplied image memory 4 to be formed as memories physically separate from each other. These two memories may be combined into one memory. In such a case, a storage area of one memory may be assigned to each of the input image memory 2 and the pixel-multiplied image memory 4.

In this embodiment, all of the address supply circuit 1, the input image memory 2, the pixel-multiplied image forming circuit 3, the pixel-multiplied image memory 4, and the RMW circuit 5 are formed on one chip. However, it is not always necessary to form these components on one chip.

In this embodiment, only a pixel-multiplied image obtained by increasing the number of pixels of an original image is formed. However, an image obtained by reducing the number of pixels of the original image may be formed and stored simultaneously with the pixel-multiplied image.

The present invention can be applied to processing of an image scanned in a noninterlacing manner as well as to processing of an image scanned in an interlacing manner.

In this embodiment, the storage apparatus is realized in a hardware form. The storage apparatus of the present invention, however, may be realized by making a computer execute a program for performing the above-described processing.

In the embodiment shown In FIG. 6, the pixel-multiplied image memory 4 is formed of one memory 22. Also in the arrangement shown in FIG. 6, the pixel-multiplied image memory 4 may be formed of four memories 13a to 13d, as is that in the arrangement shown in FIG. 5. In such a case, the output of the counter 21 may be used as a signal for selecting one of the four memories 13a to 13d, i.e., a kind of chip select signal, instead of being added as the least significant bit of horizontal address HA and vertical address VA.

In this embodiment, pixels (pixel values) are stored in, for example, a memory represented by a RAM (random access memory) or the like. Alternatively, pixels may be stored (recorded) on a recording medium, e.g., a magnetic disk, a magneto-optical disk, a magnetic tape, or an optical card.

In the storage apparatus and the storage method of the present invention, an input image is stored in a first storage means in which addresses are designated by at least first and second address signals, and a pixel-multiplied image which is an image formed of a number of pixels greater than the number of pixels forming the input image is formed from the input image, the pixel-multiplied image being stored in a second storage means in which addresses are designated by at least first and second address signals. Consequently, it is possible to immediately provide an image obtained by enlarging the input image.

Other various changes and modifications of the present invention are conceivable without departing from the spirit and scope of the invention, and the gist of the present invention is not limited to the above-described embodiments.

What is claimed is:

1. A storage apparatus for storing an image, comprising:
   a first memory section having addresses designated therein by at least first and second address signals to store input image data;
   a forming section for forming, from the input image data, pixel-multiplied image data representing a pixel-multiplied image formed of a number of pixels greater than the number of pixels forming an image represented by the input image data; and
   a second memory section having addresses designated therein by at least the first and second address signals to store the pixel-multiplied image data substantially simultaneously with the storage of said input image data in the first memory section.

2. A storage apparatus according to claim 1, wherein said second memory section has addresses stored therein by at least the first and second address signals and by an additional address signal added to the first and second address signals.

3. A storage apparatus according to claim 1, wherein said forming section forms a pixel constituting the pixel-multiplied image by performing weighting addition using a plurality of pixels in the pixels forming the input image.

4. A storage apparatus according to claim 1, wherein said forming section forms the pixel-multiplied image by using prediction coefficients for calculating a predicted value of a pixel constituting the pixel-multiplied image by linear combination with some of the pixels forming the input image.

5. A storage method comprising the steps of:
   storing input image data in a first memory section, the first memory section having addresses designated therein by at least first and second address signals;
   forming, from the input image data, pixel-multiplied image data which represents a pixel-multiplied image formed of a number of pixels greater than the number of pixels forming an image represented by the input image data; and
   storing the pixel-multiplied image data in a second memory section substantially simultaneously with the storage of said input image data in the first memory section, the second memory section having addresses designated therein by at least the first and second address signals.

6. A storage method according to claim 5, wherein, in said storage step using the second memory section, the second memory section has addresses stored therein by at least the first and second address signals and by an additional address signal added to the first and second address signals.

7. A storage method according to claim 5, wherein, in said forming step, a pixel constituting the pixel-multiplied image is formed by performing weighting addition using a plurality of pixels in the pixels forming the input image.

8. A storage method according to claim 5, wherein, in said forming step, the pixel-multiplied image is formed by using prediction coefficients for calculating a predicted value of a pixel constituting the pixel-multiplied image by linear combination with some of the pixels forming the input image.

9. A storage apparatus according to claim 1, wherein said input image data and said pixel-multiplied image data are stored in the respective first and second memory sections in synchronism with a common clock signal.

10. A storage apparatus according to claim 1, further comprising at least one delay for delaying said first and second address signals to provide delayed address signals that are provided to said second memory section, said pixel-multiplied image data being stored in said second memory section at locations in accordance with said delayed address signals, and wherein said first and second address signals are supplied to said first memory section without being delayed.

11. A storage method according to claim 5, wherein said input image data and said pixel-multiplied image data are stored in the respective first and second memory sections in synchronism with a common clock signal.

12. A storage method according to claim 5, further comprising delaying said first and second address signals to provide delayed address signals and supplying said delayed address signals to said second memory section, said pixel-multiplied image data being stored in said second memory section at locations according to said delayed address signals, and wherein said first and second address signals are supplied to said first memory section without being delayed.

13. A storage apparatus for storing an image, comprising:
   a first memory section having addresses designated therein by at least first and second address signals to store input image data;
   a forming section for forming, from the input image data, pixel-multiplied image data representing a pixel-multiplied image formed of a number of pixels greater than the number of pixels forming an image represented by the input image data;
   a second memory section having addresses designated therein by at least the same first and second address signals to store the pixel-multiplied image data; and
   circuitry for selectively reading and outputting, from said storage apparatus, said input image data stored in said first memory section or said pixel-multiplied image data stored in said second memory section.

14. The storage apparatus of claim 13, wherein said pixel-multiplied image data is stored substantially simultaneously with the storage of said input image data in the first memory section.

15. The storage apparatus of claim 13, further comprising at least one delay for delaying said first and second address signals to provide delayed address signals that are provided to said second memory section, said pixel-multiplied image data being stored in said second memory section at locations in accordance with said delayed address signals, and wherein said first and second address signals are supplied to said first memory section without being delayed.

16. The storage apparatus of claim 13, wherein said circuitry for selectively reading and outputting comprises a read modify write (RMW) circuit, and the selective reading and outputting of said input image data or said pixel-multiplied image data is made in accordance with a selection flag provided to said RMW circuit.

17. The storage apparatus of claim 13, wherein said first and second memory sections, said forming section and said circuitry for selectively reading and outputting are formed on a single chip.

18. A storage method comprising the steps of:

storing input image data in a first memory section, the first memory section having addresses designated therein by at least first and second address signals;

forming, from the input image data, pixel-multiplied image data which represents a pixel-multiplied image formed of a number of pixels greater than the number of pixels forming an image represented by the input image data;

storing the pixel-multiplied image data in a second memory section, the second memory section having addresses designated therein by at least the same first and second address signals; and selectively reading and outputting said input image data stored in said first memory section or said pixel-multiplied image data stored in said second memory section.

19. The storage method of claim 18, further comprising delaying said first and second address signals to provide delayed address signals and supplying said delayed address signals to said second memory section, said pixel-multiplied image data being stored in said second memory section at locations according to said delayed address signals, and wherein said first and second address signals are supplied to said first memory section without being delayed.

20. The storage method of claim 18, wherein said pixel-multiplied image data is stored substantially simultaneously with the storage of said input image data in the first memory section.

* * * * *